Dec. 12, 1933.  M. W. SEYMOUR  1,939,231
PHOTOGRAPHIC REVERSAL PROCESS
Filed Aug. 7, 1931

Inventor:
Merrill W. Seymour,
By Newton M. Perrins
Attorney.

Patented Dec. 12, 1933

1,939,231

UNITED STATES PATENT OFFICE 1,939,231

PHOTOGRAPHIC REVERSAL PROCESS

Merrill W. Seymour, Rochester, N. Y., assignor to Eastman Kodak Company, Rochester, N. Y., a corporation of New York Application August 7, 1931. Serial No. 555,748

4 Claims. (Cl. 95—5)

This invention relates to a photographic reversal process by means of which a film may be reversed to an image in black and white or in one of a wide range of colors.

In carrying out my invention, I first expose the film and then develop it in an ordinary photographic developer that produces virtually no stain. Such developers are caustic hydroquinone, or elon-hydroquinone-carbonate, each containing a sufficient quantity of sulphite, and many others which have been mentioned in the literature. After washing, the film is given a controlled exposure to light and is then developed to the desired contrast in a solution that produces a colored image of organic nature in the film in addition to reducing all or a part of the remaining silver halide. After the second development the silver and remaining silver halide are removed, leaving a reversed or positive image in color on the film.

In the following specification, it is understood that when I use the terms "color" or "colored image" I include an image of neutral or black and white character produced by the same method.

Reference is made to the following figures in which.

The first development to which the film is submitted should be rather full, the exact degree being determined by trial by one skilled in the art, in order to secure sufficiently clear highlights in the reversed image.

After the first development and rinsing, the film is given a controlled exposure to light. This exposure may be varied both in amount and in direction. The simplest method of varying the amount of exposure is to change the intensity of the light, but the amount may also be varied by changing the duration. With regard to the direction of the exposure, it may be applied either from the support side or from the emulsion side, or partly from each side. I have found that varying the direction of the exposure produces somewhat different results from varying the amount, so that both variations, or a combination of the two, are useful.

For example, a piece of film, which contains a yellow dye in the emulsion, is given an exposure to a light image from the emulsion side. It is then developed in a non-staining developer. It now bears a negative image consisting of a series of densities of silver corresponding to the intensities in the image to which it was exposed. This negative image lies nearer the emulsion side of the film than the support side. Consequently, if the second exposure is applied from the emulsion side, the remaining undeveloped silver bromide is shielded more by the first developed image than if the second exposure is applied from the support side.

Figure 1:
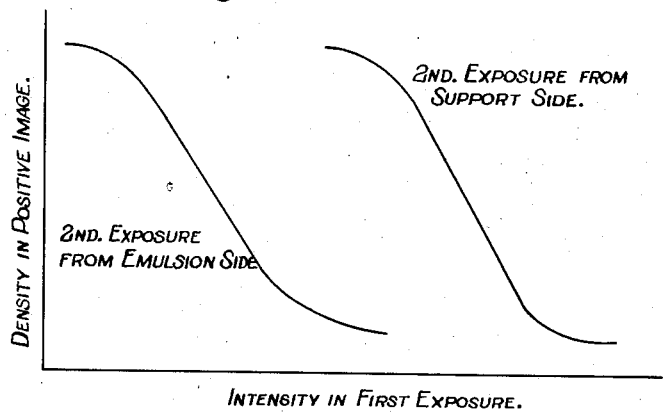
Fig. 1 shows H and D curves for films exposed from the emulsion and support sides.

The precise effect of the direction of the second exposure may be determined by plotting the densities in the subsequently developed positive color image, measured after all silver and silver salts have been removed, against the intensities in the first exposure, so as to obtain an H and D curve. I have found by experiment that H and D curves obtained when the second exposures are applied from the emulsion and support sides are very similar except that they are separated in the direction of the exposure axis as shown in Fig. 1. The gamma and maximum density in the two curves are approximately the same. The curve obtained with the second exposure from the emulsion side appears as if the first exposures had all been multiplied by a constant factor. In other words, the film appears faster with respect to the first exposure when the second exposure is applied from the emulsion side. This fact enables the operator to compensate for variations in the first exposure of the film by varying the direction of the second exposure. Thus, after inspection of the developed negative image by nonactinic light, he may apply the second exposure either from the support side or from the emulsion side, or partly from each side. If the film has been somewhat underexposed in the first exposure, he will apply most of the second exposure from the emulsion side. If the film has been somewhat overexposed in the first exposure, he will apply most of the second exposure from the support side. In the preceding discussion, it is assumed that the second exposure (that is, the product of intensity and time) has been kept constant in amount and that the second development has been kept constant.

Figure 2:
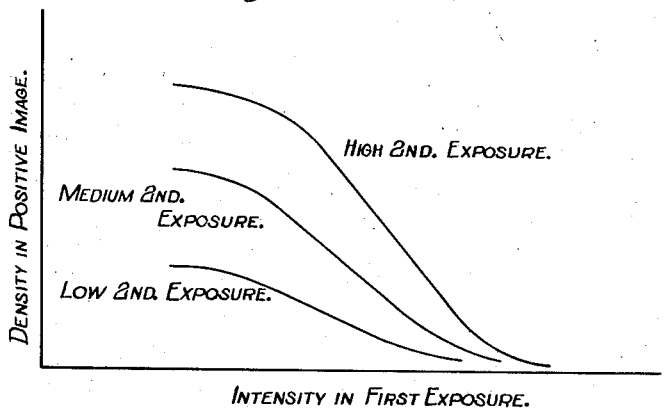
Fig. 2 shows H and D curves for films given a varied second exposure.

If, however, the direction of the second exposure is kept the same, and the amount varied, as is customary in certain reversal processes with controlled second exposure, I find that the gamma and maximum density are varied. In general, I find that the lower the second exposure, the lower is the gamma and maximum density of the positive color image with constant second development. These relations are illustrated in Fig. 2.

Thus, by varying the direction or the amount of the second exposure, or both, the operator may control the quality of the positive color image within wide limits. The results will naturally vary with the kind of photographic emulsion used and the amount of light-restraining dye, if any, which it contains, so that the above discussion is an illustration only, and must be varied somewhat to conform to different materials.

After the second exposure, the film is developed in a solution that produces a dye image associated with a silver image. Such developers may be called color forming developers. Specific examples of such developers are the following:

*Example I*

| | |
|---|---|
| α Naphthol | 0.5 grams |
| Acetone | 25.0 c. c. |
| P-amino-diethyl aniline | 0.5 grams |
| Sodium carbonate | 7.5 grams |
| Water to | 250.0 c. c. |

This solution produces a primary blue image.

*Example II*

| | |
|---|---|
| 1:5 dihydroxy naphthalene | 0.5 grams |
| Acetone | 20.0 c. c. |
| 2:5 dibromo-4-amino-phenol | 0.5 grams |
| Sodium carbonate | 7.5 grams |
| Water to | 250.0 c. c. |

This solution produces a very nearly neutral image (blue-black).

Many other developers are usable and yield various colors such as magenta, blue-green, yellow, brown, etc. Other such developers are given in Patents #1,055,155 of 1913, #1,102,028 of 1914, and British Patent #2,562, of 1913, all issued to Fischer. Still others are given in my co-pending application, Serial #536,659, filed May 11, 1931.

After development in the second developer, and subsequent washing, both the reduced silver and all the remaining silver bromide are removed by any process that will not destroy the dye image. Solutions which are satisfactory for this purpose are Farmer's reducer, a bath containing potassium ferri-cyanide and potassium bromide followed by fixing in hypo, or a bath containing potassium ferri-cyanide and ammonia. Formulæ for such baths are well known and may be found in the photographic literature. It is to be noted that there are two silver images, one formed by the first developer and one formed by the second developer, which, together with the remaining silver halide, are removed in this last step.

After a thorough washing, the image is complete and may be dried. If the process is carried out with motion picture film which has been exposed in a camera in the ordinary way, the resulting print will be a positive in monochrome.

I contemplate as included within my invention all variations, modifications, and equivalents coming within the scope of the appended claims, and the use of the method for any purpose for which a direct reversal to a colored image is desirable.

What I claim as my invention and desire to be secured by Letters Patent of the United States is:

1. The method of producing a reversed photographic image which comprises exposing to a light image a photo-sensitive silver halide element, developing the element in an ordinary non-staining developer, giving said element a second controlled exposure to white light, developing the second exposure in a developer which produces a dye image associated with a silver image, and then removing both silver images and any remaining silver halide.

2. The method of producing a reversed photographic image which comprises exposing to a light image a photo-sensitive silver halide element, developing the element in an ordinary non-staining developer, giving said element a second controlled exposure to white light partially through the support and partially from the emulsion side, developing the second exposure in a developer which produces a dye image associated with a silver image, and then removing both silver images and any remaining silver halide.

3. The method of producing a reversed photographic image which comprises exposing to a light image a photo-sensitive silver halide element, developing the element in an ordinary non-staining developer, giving said element a second controlled exposure to white light partially through the support and partially through the emulsion side, developing the second exposure in a developer which produces a dye image of a substantially neutral color associated with a silver image, and then removing both silver images and any remaining silver halide.

4. The method of producing a reversed photographic image which comprises exposing to a light image a photo-sensitive silver halide element, developing the element in an ordinary non-staining developer, giving said element a second controlled exposure to white light partially through the support and partially through the emulsion side, developing the second exposure in a developer which contains 1:5 dihydroxy naphthalene and 2:5 dibromo-4-amino-phenol and which produces a dye image of a substantially neutral color associated with a silver image, and then removing both silver images and any remaining silver halide.

MERRILL W. SEYMOUR.